United States Patent [19]
Yoo

[11] Patent Number: 4,825,039
[45] Date of Patent: Apr. 25, 1989

[54] GLOVE ASSEMBLY FOR USE AT LOW TEMPERATURE

[76] Inventor: Jhin P. Yoo, 847-19, Sihung-bon-dong, Kuro-ku, Seoul, Rep. of Korea

[21] Appl. No.: 96,477

[22] Filed: Sep. 15, 1987

[30] Foreign Application Priority Data

Sep. 2, 1987 [KR] Rep. of Korea .................. 15005

[51] Int. Cl.⁴ .............................................. H05B 3/56
[52] U.S. Cl. ..................................... 219/212; 219/202; 219/204
[58] Field of Search ............... 219/211, 204, 202, 528, 219/529, 527, 549

[56] References Cited

U.S. PATENT DOCUMENTS

| | | | |
|---|---|---|---|
| 1,011,574 | 12/1911 | Carron | 219/204 |
| 2,227,781 | 1/1941 | Joy | 219/211 |
| 3,858,028 | 12/1974 | Kerr | 219/211 |
| 4,021,640 | 5/1977 | Gross | 219/211 |

FOREIGN PATENT DOCUMENTS

| | | | |
|---|---|---|---|
| 2922620 | 12/1980 | Fed. Rep. of Germany | 219/211 |
| 3047476 | 8/1982 | Fed. Rep. of Germany | 219/204 |
| 589631 | 3/1959 | Italy | 219/211 |

Primary Examiner—Teresa J. Walberg
Attorney, Agent, or Firm—Birch, Stewart, Kolasch & Birch

[57] ABSTRACT

A glove assembly for vehicle drivers or others working in low temperature which includes a glove containing an electric heating wire disposed therewithin and a pair of contacting members extending from both ends of the electric heating wire, and a handle grip having a pair of metal meshes, whereby when a driver grasps the handle grip with the glove, the contacting members contact with the meshes and warm the drivers' hands.

4 Claims, 2 Drawing Sheets

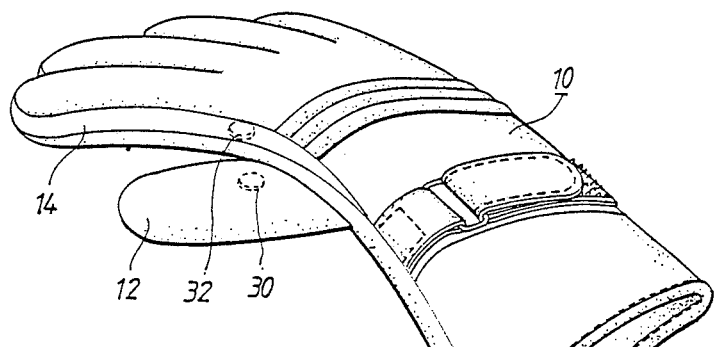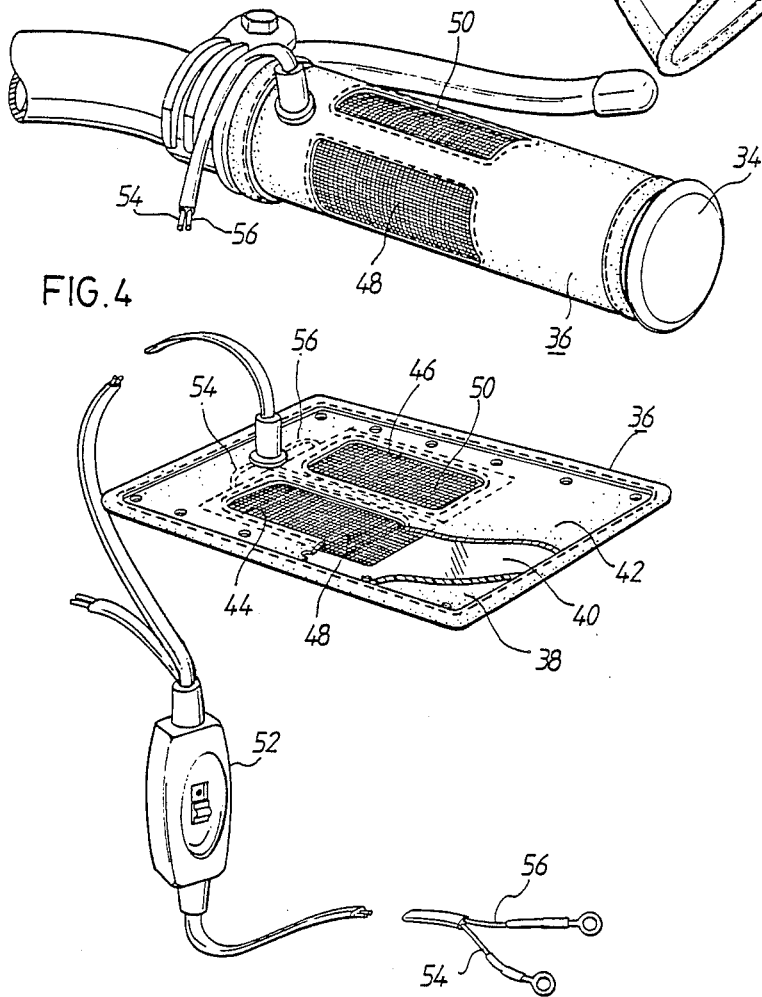

GLOVE ASSEMBLY FOR USE AT LOW TEMPERATURE

FIELD OF THE INVENTION

The present invention relates to a glove assembly for use at low temperature and particularly, to a combined glove containing heating wires and a handle grip for a motorcycle which is warmed by current supplied from the power supply of the motorcycle.

DESCRIPTION OF THE PRIOR ART

In the prior art, a winter glove is provided with a heating wire disposed inside of it, and the heating wire is electrically connected to a dry cell as a power supply. But in such a type of winter glove which has a pocket which contains a dry cell so that the user can wear it without difficulties, the life of the dry cell is too short to be economical. Also in the case of using a separate power supply, for example, such as a storage battery loaded on a motorcycle, it is necessary for a long electric lead to connect the storage battery and the glove. And the electric lead is mechanically connected to a connector which is extended from the heating wire of the glove so that the radius of action of one who wears the glove is constrained by the electric lead.

In another approach, which is designed to supply current from a storage battery of a motorcycle as a power supply to a handle grip in which a heating wire to be heated is arranged, the device cannot effectively warm the user's hand because of the small amount of heat transferred through the glove from the handle grip.

Generally speaking, in extreme cold weather or in the coldest season, when one who works in the outdoors or rides a motorcycle is exposed to the weather conditions, and a winter glove to be warmed by electric heat must be efficient for warmming the hand without reducing operation efficiency.

SUMMARY OF THE INVENTION

An object of the present invention is to provide a combined glove and handle grip which solves the problem of the prior art. In the present invention, a storage battery loaded on a motorcycle or other working vehicles is used as a power supply, and when grasping the handle grip by wearing the winter glove, the supply of current is achieved by electrically contacting a pair of disc-shaped contacts of the winter glove and a pair of metal meshes of the handle grip.

BRIEF DESCRIPTION OF THE DRAWINGS

An example of the invention will be explained with reference to the accompanying drawngs, in which;

FIG. 3 is a perspective view of the combined winter glove and handle grip according to the present invention; and FIG. 4 is a perspective view with a part taken away of a grip cover of the handle grip according to the present invention.

DESCRIPTION OF THE PREFERRED EMBODIMENTS

Figure 1:
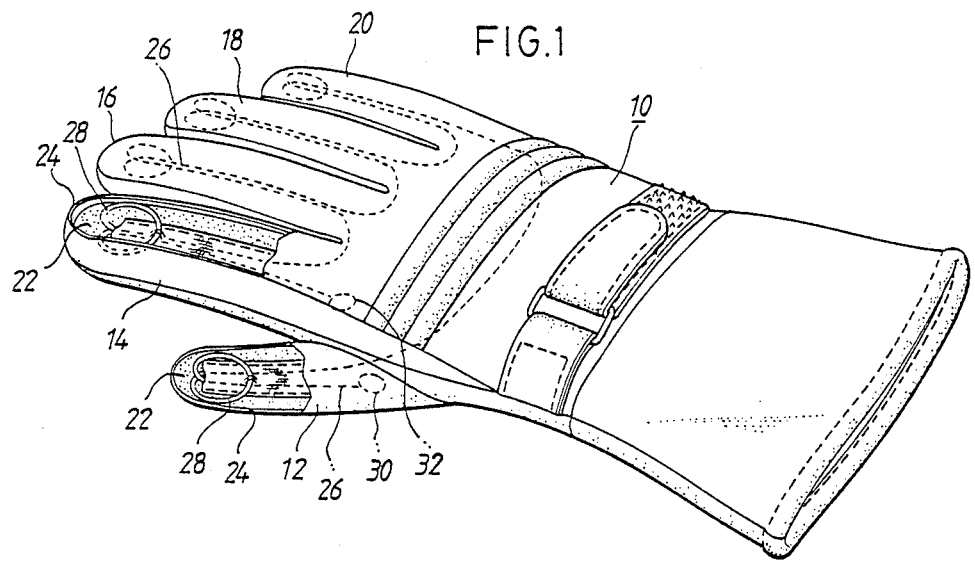
FIG. 1 is a perspective view with a part taken away of a winter glove according to the present invention.
Figure 2:
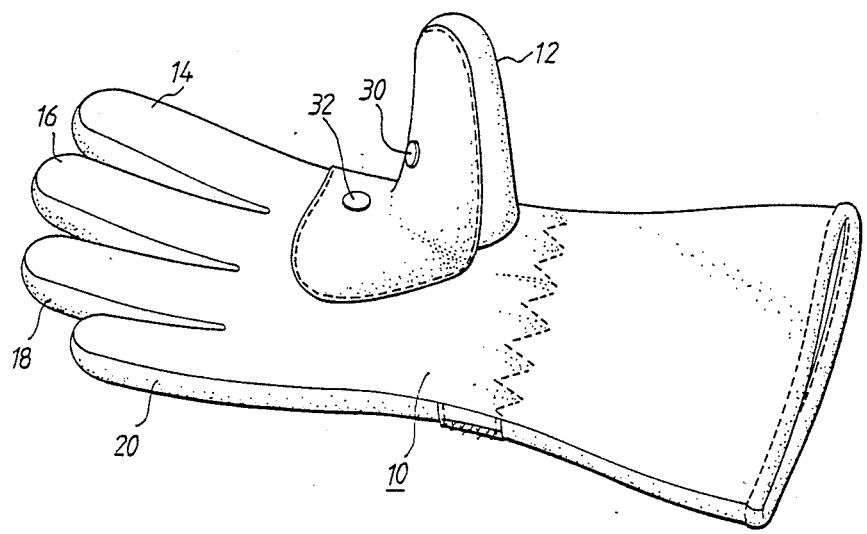
FIG. 2 is a perspective view showing a pair of disc-type contacts disposed in the palm portion of the winter glove according to the present invention.

FIGS. 1, 2, and 3 show a combined winter glove 10 and handle grip 34 of the present invention. The winter glove 10 has five separate sheaths 12, 14, 16, 18 and 20 for each finger and the thumb and the handle grip 34 has a cylindrical configuration for being grasped by the user who wears the winter glove 10. The winter glove comprises a liner 22 and an outer covering 24. An electric heating wire 26 is arranged between the liner 22 and the outer covering 24 of each separate sheath 12–20 and forms a loop 28 at each tip of sheaths. When current is supplied, the loop 28 warms the tip of a finger. Each end of the heating wire 26 is arranged in the glove 10 and extended and connected to two disc-type contacts 30 and 32 which are mounted at palm-side base portions of the sheath 12 for the thumb and at the sheath 14 for the index finger, respectively.

FIG. 3 and FIG. 4 show the handle grip 34 which is used in combination with the glove 10 shown in FIG. 1 and FIG. 2. The handle grip 34 is covered with a grip cover 36 as shown in FIG. 4. The grip cover 36 which is a type of plate when unfolded, comprises a base layer 38 of a fabric, a middle rubber layer 40, and an upper layer 42 made by synthetic leather, wherein the upper layer 42 is provided with two rectangular openings 44 and 46, and two flexible metal meshes 48 and 50, such as a conductive stainless steel mesh, which are fixed between the upper layer 42 and the middle rubber layer 40. The metal meshes 48 and 50 are exposed through the openings 44 and 46 to form two contact portions.

The plate-type grip cover 36 is wholly flexible so that it can be covered and fixed around the handle grip 34 of the motorcycle by a string (not shown).

The conductive metal meshes 48 and 50 are exposed through the openings 44 and 46 to form the contact portions 30 and 32 of the winter glove and are electrically connected to leads 54 and 56 which are connected to a storage battery (not shown) and have a switch 52 in a suitable position of the leads. These leads 54 and 56 are of a type of covered cable which can be anchored easily to a frame of the motorcycle.

In the present invention, when a motorcycle rider or an operation vehicle driver grasps the handle grip 34 with his hand wearing the glove 10 and turns on a switch 52, the contacts 30 and 32 mounted at the palm-side base portion of the sheath 12 for the thumb and the sheath 14 for the index finger are electrically connected to the metal mesh contact portions 48 and 50 of the grip cover 36 covered around the handle grip 34, and current flows to the heating wire 26 arranged in the glove 10 so that the hand will be warmed by heat generated from the heating wire 26.

Since the size of contacts 30 and 32 mounted at the glove 10 is relatively smaller than the area of the conductive metal mesh contact portions 48 and 50 formed at the openings 44 and 46 of the grip cover 36, the contacts 30 and 32 and the metal mesh contact portions 48 and 50 have continuous electrical contacts as long as the user grasps the handle grip 34 with his hand wearing the glove 10. Although the position of the hand wearing the glove 10 which grasp the handle grip 34 may be somewhat displaced, the electric contacts between two contact 30 and 32 and metal mesh contact portions 48 and 50 are maintained to be effective, respectively, and thus the warming effect of the glove 10 can be preserved. As soon as the user takes his hand wearing the glove 10 off the handle grip 34, the supply of power is cut, and there is no trouble in getting on or off the motorcycle or operation vehicle.

What is claimed is:

1. A glove assembly for vehicle drivers or others working at low temperature which comprises:
   a glove having separate sheaths for receiving a tumb and fingers including:
   a liner and an outer covering,
   an electric heating wire arranged between said liner and said outer covering, said electric wire being provided with a plurality of loops arranged in a tip of each of said separate sheaths, and
   a pair of electrically raised contacting members each of said contacting member extending from one end of said electric heating wire, said contacting members being positioned on palm-side base portions of said sheaths of the thumb and index finger, respectively, and
   a cylindrical handle grip disposed on a vehicle and operatively associated with said glove, said cylindrical handle grip including:
   an insulating base layer,
   an insulating middle layer,
   an upper layer having a pair of openings which receive a pair of conductive metal meshes disposed between said upper layer and said middle layer, and
   connecting means for electrically connecting a power source of said vehicle to said pair of conductive metal meshes, whereby, when a vehicle driver grasps said cylindrical handle grip with said glove, said pair of raised contacting members contact with said pair of conductive metal meshes so that the hands of the vehicle driver are warmed by heat generated from the heating wire.

2. The glove assembly of claim 1, wherein each of the pair of raised contacting members has a disc-type configuration.

3. The glove assembly of claim 2, wherein each of the openings disposed in the upper layer has a rectangular configuration.

4. The glove assembly of claim 1, wherein the middle layer is made of rubber.

* * * * *